United States Patent [19]

Tadmor et al.

[11] 4,049,245
[45] Sept. 20, 1977

[54] APPARATUS AND METHOD FOR PREPARING A PLASTICATED MATERIAL

[75] Inventors: Zehev Tadmor, Haifa, Israel; Imrich Klein, Highland Park, N.J.

[73] Assignee: Scientific Process & Research, Inc., Highland Park, N.J.

[21] Appl. No.: 593,432

[22] Filed: July 7, 1975

[51] Int. Cl.$^2$ ............................ B29B 3/00; B29H 1/10
[52] U.S. Cl. ..................................... 259/191; 425/208
[58] Field of Search ..................... 259/191, 192, 9, 10, 259/97; 425/207, 208; 198/213–217; 100/144, 150

[56] References Cited

U.S. PATENT DOCUMENTS

| 3,850,415 | 11/1974 | Hansen | 259/191 |
| 3,902,704 | 9/1975 | Ishibashi et al. | 259/191 |

OTHER PUBLICATIONS

Design and Control of Extruders using Computerized Models, Reprint from Wire & Wire Products, Oct. 1972.

*Primary Examiner*—Robert I. Smith
*Attorney, Agent, or Firm*—Samuelson & Jacob

[57] ABSTRACT

Apparatus and method for preparing a plasticated material from solids introduced into the apparatus, the apparatus including a barrel having a screw conveyor defining a channel for conveying the material in a downstream direction as the material is melted, the channel including a solids conveying zone and a melting zone downstream from the solids conveying zone, the apparatus and the method including, respectively, means and the step of providing an abrupt change in the volume of the channel at a specified location between the solids conveying zone and the melting zone for inducing the formation of a melt pool in the channel at that location.

15 Claims, 12 Drawing Figures

APPARATUS AND METHOD FOR PREPARING A PLASTICATED MATERIAL

The present invention relates generally to plasticating apparatus and method and pertains, more specifically, to apparatus and method for increasing the melting capacity of plasticating extruders.

Broadly, plasticating extruders comprise a screw conveyor rotating in a cylindrical barrel. The purpose of the arrangement is to plasticate, or melt, a solid material, or a molten material having a high viscosity at room temperature, utilizing the viscous heat generated in the material occupying the space between the screw conveyor and the barrel by the relative motion between the screw conveyor and the barrel. The space is usually referred to as the channel of the extruder because of the shape of the space.

Irrespective of the geometry of the channel, or of the screw conveyor and barrel, the channel can be divided into several functional zones; namely, a solids conveying zone, a delay zone, a melting zone and, finally, a melt conveying zone. Each subsequently listed zone is located downstream from a previously listed zone.

The solids conveying zone occupies that portion of the channel where no melting of the solid material takes place. The length of the zone is roughly defined by the length of the permanently cooled and unheated barrel in the vicinity of the hopper which feeds the solid material to the screw conveyor. The function of the solids conveying zone is to compact the solids in the channel into a solid bed.

The delay zone starts at the point where the inner surface of the barrel reaches the melting point of the material, either as a result of heat conducted through the hot barrel, or because of frictional heat generated by the solid bed rubbing against the barrel. The melt generated at the inner surface of the barrel forms a continuous film, provided the solid bed is sufficiently compacted. Sufficient compacting depends upon the effectiveness of the solids conveying zone. Over the entire length of the delay zone, melt appears only in the film between the solid bed and the barrel.

The melting zone starts at the point where the delay zone ends and where a melt pool begins to form, cross-channel between confronting faces of the flight of the screw conveyor. Over the length of the melting zone, a melt pool will exist at the downstream face, or pushing side, of the flight, the melt pool replacing the progressively melting solid bed. The melting zone occupies most of the length of the extruder.

The melt conveying zone is the last functional zone of the extruder and refers to the portion where unmelted solid material is no longer present.

The same general arrangement is present in all processing equipment based upon a rotating single screw conveyor in a barrel, such as is found in blow molding and injection molding equipment.

A variety of materials is processed in similar extruders. Among these materials are thermoplastic materials, rubbers, foods for both humans and animals, and even thermosetting materials which undergo a change in viscosity and chemical structure with temperature and residence time in the extruder.

Most plasticating extruders are between sixteen and twenty-four diameters long. Depending upon operating conditions, properties of the given material and the design of the machine, and especially the screw conveyor, one to four diameters of length are taken up by the delay zone. Under some conditions, no melt pool is formed at all and the delay zone occupies most of the length of the extruder.

It is an object of the present invention to provide apparatus and method whereby the delay zone can be shortened or completely eliminated, thus permitting the melting zone to start at an earlier point in an extruder, thereby increasing the melting capacity of the extruder.

Another object of the invention is to provide means and method for producing a better quality extrudate from plasticating extruders.

Still another object of the invention is to provide means and method by which extruders, molding machines and the like can be operated at higher levels of production with equal or better product quality as compared to conventional machines of similar size. In some instances, the high level of solids which results from poor melting tends to choke-off production. Improved melting therefore can immediately increase production rate, even without a change in operating conditions.

A further object of the invention is to provide improved operating characteristics in an extruder without a radical departure from conventional extruder arrangements so as to enable economical us of the invention.

The above objects, as well as still further objects and advantages, are attained by the invention which may be described briefly as apparatus and method for preparing a plasticated material from solids of a given material introduced into the apparatus, the apparatus comprising a barrel, a screw conveyor in the barrel, the screw conveyor including a flight defining a channel for conveying the given material in a downstream direction as the material is melted within the channel, the flight having a leading face facing downstream and a trailing face facing upstream, the channel having a given volume between confronting leading and trailing faces, the channel including a solids conveying zone and a melting zone downstream from the solids conveying zone, the apparatus including means and the method including the step of providing an abrupt change in the volume of the channel at a location between the solids conveying zone and the melting zone for inducing the formation of a melt pool in the channel at that location.

The invention will be more fully understood, while still further objects and advantages thereof will become apparent, in the following detailed description of preferred embodiments illustrated in the accompanying drawing, in which.

Figure 1:
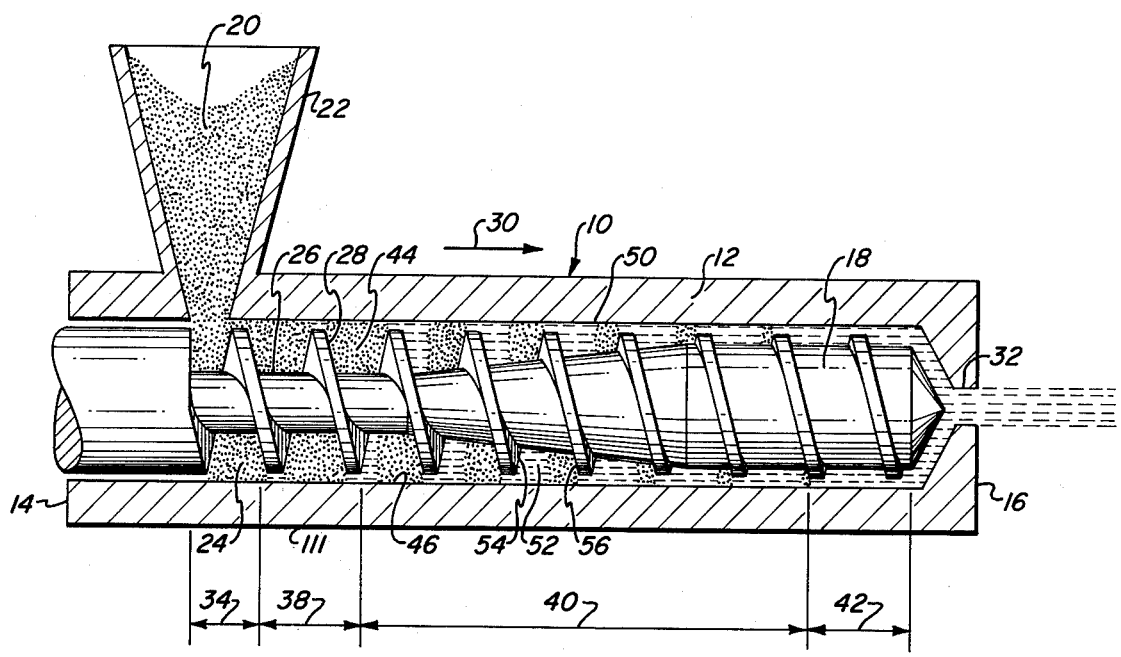
FIG. 1 is a schematic representation of a typical plasticating extruder now in common use.
Figure 2:
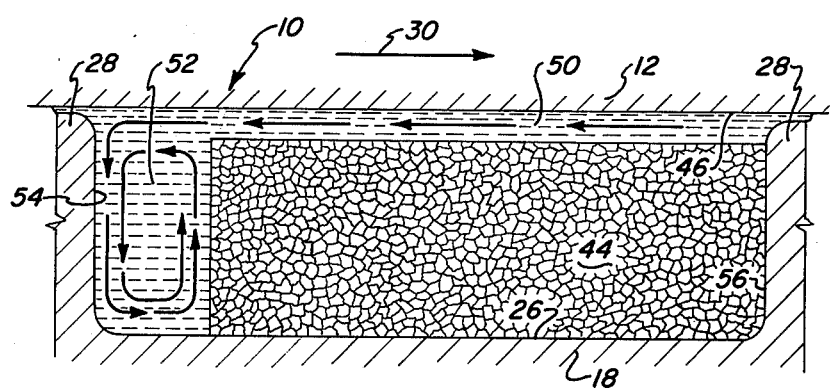
FIG. 2 is an enlarged, cross-channel, cross-sectional view of a portion of the channel in the extruder of FIG. 1.

Referring now to the drawing, and especially to FIGS. 1 and 2 thereof, a plasticating extruder of the type now in common use is illustrated schematically at 10 and is seen to include a barrel 12 extending axially between an upstream end 14 and a downstream end 16, and a screw conveyor 18 in the barrel. The purpose of the illustrated arrangement is to melt, or plasticate, a solid material, or a molten material having a high viscosity at room temperature, and to deliver, or pump, the plasticated material to a further apparatus, such as a molding machine, a die or the like. It will be understood that the terms "solids" and "solid material", as employed herein, include highly viscous materials which behave similar to a given solids in the described apparatus, as well as actual solid materials. A reservoir of solid material 20 is held in a hopper 22 which communicates with the inner chamber 24 of the barrel 12 adjacent the upstream end 14 and feeds the solid material 20 into a channel 26 defined by a helical flight 28 on the screw conveyor 18. Rotation of the screw conveyor 18 within the barrel 12 will advance the material 20 along the channel 26 in a downstream direction 30 until the material is delivered, in melted form, to a discharge point 32 at the downstream end 16 of the barrel.

Extruder 10 may be divided into several functional zones; namely, a solids conveying zone 34, a delay zone 38, a melting zone 40, and a melt conveying zone 42.

The hopper 22 serves as a reservoir for the solid material 20 and assures that solids are continuously supplied to the extruder. The solids enter the solids conveying zone 34 at the hopper 22 and are conveyed by the screw conveyor 18 to the delay zone 38. The solids conveying zone 34 occupies a portion of the channel 26 where no melting of the solid material 20 takes place. The length of the solids conveying zone 34 is roughly defined by the length of the unheated portion of the barrel 12 in the vicinity of the hopper 22. The function of zone 34 is to compact the solids in the channel into a solid bed 44.

The delay zone 38 starts at the point where the inner surface 46 of the barrel 12 reaches the melting point of the material 20, either as a result of heat conducted through a heated barrel, or because of frictional heat generated by the solid bed 44 rubbing against the barrel. The melt generated at the inner surface 46 of the barrel 12 forms a continuous film 50, provided that the solid bed 44 is sufficiently compacted. Compacting of the solid bed 44 depends upon the effectiveness of the solids conveying zone 34. Over the whole length of the delay zone 38, melt appears only in the film 50 between the solid bed 44 and the inner surface 46 of the barrel 12.

The melting zone 40 begins at the point where the delay zone 38 ends and where a melt pool 52 starts to form, cross-channel between the leading face 54 of the flight 28, which faces downstream, and the confronting trailing face 56 of the flight 28, which faces upstream. Referring now to FIG. 2, as well as to FIG. 1, the melt pool 52 is juxtaposed with the leading face 54 of the flight 28 and gradually replaces the progressively melting solid bed 44 throughout the length of the melting zone 40. The melting zone 40 usually occupies the major portion of the length of the extruder 10.

The melt conveying zone 42 is the last functional zone of the extruder 10 and identifies the portion of the extruder where no unmelted solids remain. In zone 42, melted material is pumped to the discharge point 32 at end 16 of the barrel.

As illustrated in more detail in FIG. 2, the melt film 50, which is generated at the inner surface 46 of the barrel 12, is continuously fed from the solid bed 44 and, as the volume of the solid bed decreases and the volume of the melt increases, the melt spills into the low shear melt pool 52. As the melting process continues, the melt pool 52 grows in volume while the solid bed 44 decreases in volume.

Figure 3:
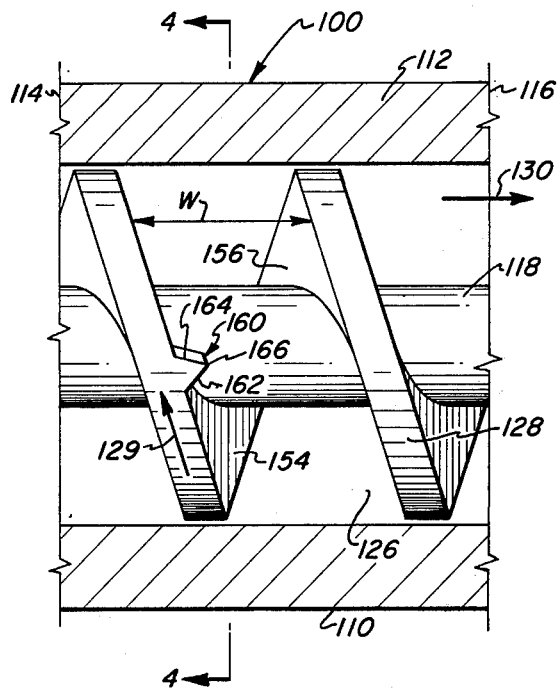
FIG. 3 is an enlarged segment of a plasticating extruder constructed in accordance with the invention.
Figure 4:
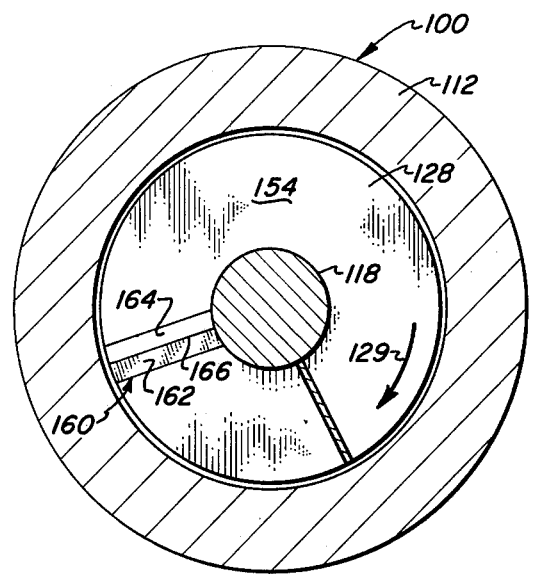
FIG. 4 is a cross-sectional view taken along line 4—4 of FIG. 3.

Turning now to FIGS. 3 and 4, an enlarged segment of a plasticating extruder 100 constructed in accordance with the invention is illustrated generally at 110. Segment 110 is taken from a portion of extruder 100 corresponding to portion 111 of extruder 10.

Extruder 100 includes a barrel 112, extending axially between upstream portion 114 and downstream portion 116, and a screw conveyor 118 in the barrel. A channel 126 is defined by helical flight 128 on the screw conveyor 118. Rotation of the screw conveyor 118, in the direction of the arrow 129, will advance material which is to be plasticated (not shown) along the channel 126 in a downstream direction 130.

Channel 126 has a prescribed width W which lies between the leading face 154 of flight 128, which faces downstream, and the confronting trailing face 156, which faces upstream. Thus, channel 126 has a given volume defined by the prescribed width between the confronting leading and trailing faces 154 and 156.

It is noted that segment 110 of extruder 100 corresponds to portion 111 of extruder 10, which portion 111 lies in delay zone 38. As explained above, the delay zone starts at the point where the inner surface of the barrel reaches the melting point of the material carried in the channel and continues until a melt pool forms. The formation of a melt pool accommodates the melt which, prior to the formation of a melt pool, lay in the relatively thin melt film. Once the melt pool is established, the melting zone begins and melting of the material can proceed at a higher rate as compared to the rate of melting in the delay zone. By reducing the length of the delay zone, or even eliminating the delay zone entirely, melting can proceed at the higher rate much sooner, thus permitting the melting zone to start at an earlier point in the extruder, thereby increasing the melting capacity of the extruder.

The present invention reduces the length of the delay zone and, under certain operating conditions, essentially eliminates the delay zone by providing an abrupt change in the volume of the channel at a location between the solids conveying zone and the melting zone for inducing the formation of a melt pool in the channel at that location. By thus inducing the formation of a melt pool, the melting zone is started at an early point in the extruder and melting proceeds at a relatively high rate.

The term "abrupt change" is meant to express a change within the dimensions of the channel which takes place so suddenly that the solid material being conveyed through the channel cannot follow the changed dimensions, causing a void to form between the solid material and the screw conveyor. The void then becomes a pocket for receiving the melt in the melt film, thereby enabling replacement of the melt in the melt film with new melt formed from the solid bed. In effect, the void becomes a melt pool, the formation of which is induced by the "abrupt change" in the dimensions of the channel. In the embodiments described below the abrupt change is a change in the width of the channel resulting from means which provide an abrupt change in the contour of the leading face of the flight of the screw conveyor. The void generated by the abrupt change is thus located adjacent the leading face of the flight and establishes a melt pool in the conventional location.

In the embodiment illustrated in FIGS. 3 and 4, the means providing the abrupt change in volume is a protuberance shown in the form of a rib 160 projecting from the leading face 154 of the flight 128 toward the trailing face 156. Rib 160 extends radially along the leading face and provides an abrupt change in the width of the channel 126 between the confronting leading and trailing faces 154 and 156 at a location between the solids conveying zone and the melting zone. As best seen in FIG. 3, rib 160 has a cross-sectional configuration including generally straight sides 162 and 164 intersecting at a point at the downstream edge 166 of the rib.

As the screw conveyor 118 rotates, in the direction of arrow 129, the abrupt change in width provided by rib 160 as the rib sweeps along its path of travel will create a void in the solid material, the void being located behind the rib, adjacent side 162, which void serves as the beginning of a melt pool. Thus, the abrupt change, in the form of an abrupt increase in width W immediately behind the rib 160, results in the formation of a void which acts as the required melt pool and starts the melting zone, with a concomitant high melting rate.

Figure 5:
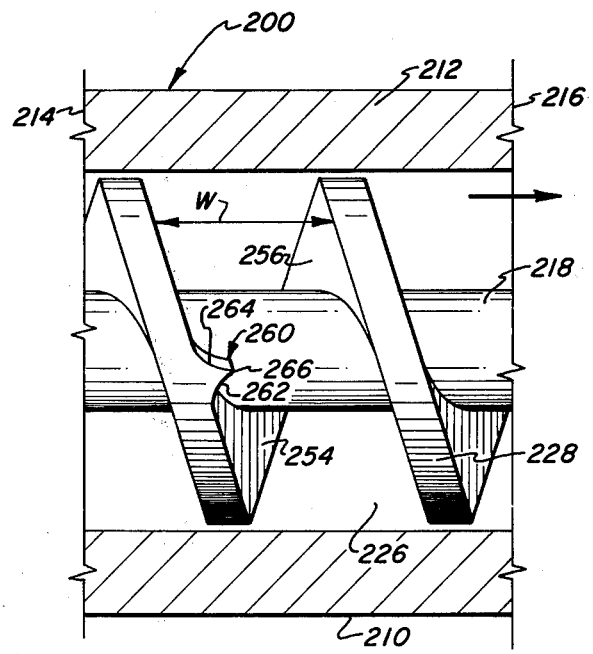
FIG. 5 is an enlarged segment of another plasticating extruder constructed in accordance with the invention.

Turning now to FIG. 5, another embodiment of the invention in alternate extruder 200 is illustrated in the form of segment 210 which corresponds to portion 111 of extruder 10 and segment 110 of extruder 100.

As in the earlier-described embodiment, extruder 200 includes a barrel 212 extending axially between upstream portion 214 and downstream portion 216, and a screw conveyor 218 in the barrel. A channel 226 is defined by flight 228 and has a prescribed width W between confronting leading and trailing faces 254 and 256, respectively. The means providing the abrupt change in the width W is in the form of rib 260 having a cross-sectional configuration which includes generally concave curved sides 262 and 264 intersecting at a point at the downstream edge 266 of the rib.

Figure 6:
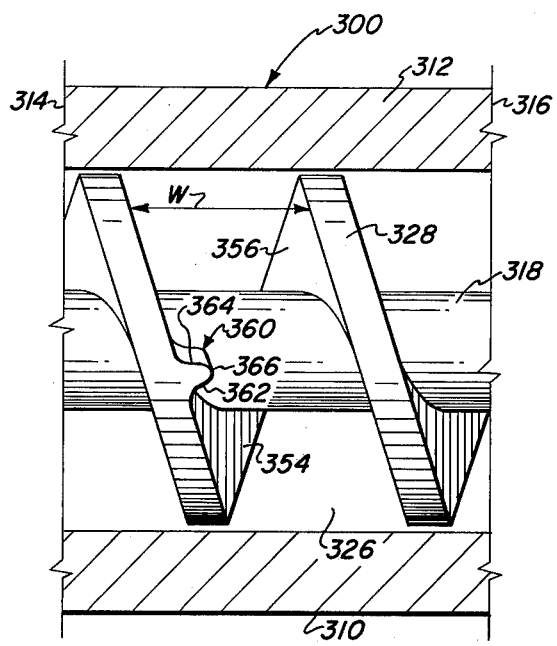
FIG. 6 is an enlarged segment of still another plasticating extruder constructed in accordance with the invention.

In the embodiment of FIG. 6, another alternate extruder 300 is illustrated in the form of segment 310 which corresponds to portion 111 of extruder 10 and segments 110 and 210 of extruders 100 and 200, respectively.

As in the earlier-described embodiments, extruder 300 includes a barrel 312 extending axially between upstream portion 314 and downstream portion 316, and a screw conveyor 318 in the barrel. A channel 326 is defined by flight 328 and has a prescribed width W between confronting leading and trailing faces 354 and 356, respectively. The means providing the abrupt change in width W is in the form of rib 360 having a cross-sectional configuration which includes generally concave curved sides 362 and 364 intersecting a convex curve along the downstream end 366 of the rib.

Figure 7:
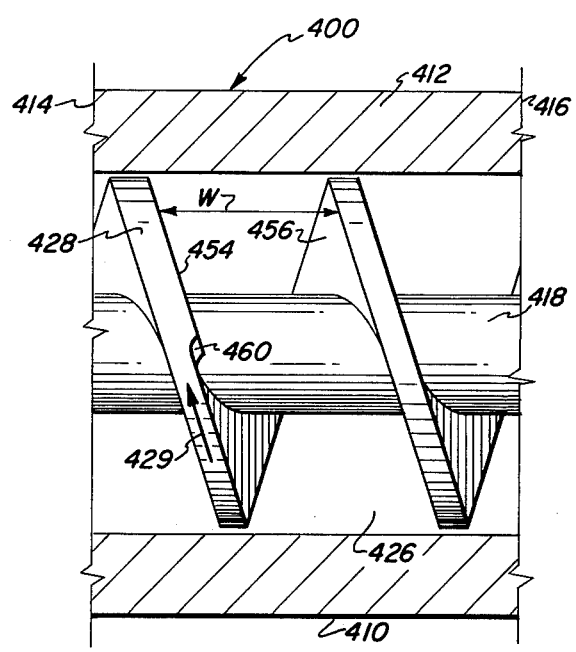
FIG. 7 is an enlarged segment of a further plasticating extruder constructed in accordance with the invention.

Referring now to FIG. 7, another alternate extruder 400 is illustrated in the form of segment 410 which corresponds to portion 111 of extruder 10 and segments 110, 210 and 310 of extruders 100, 200 and 300, respectively.

Extruder 400 also includes a barrel 412 extending axially between upstream portion 414 and downstream portion 416, and a screw conveyor 418 in the barrel. A channel 426 is defined by flight 428 and has a prescribed width W between confronting leading and trailing faces 454 and 456, respectively. In this instance, the means providing the abrupt change in width is in the form of a depression 460 in the leading face 454 of flight 428 established by an abrupt decrease in the thickness of flight 428 at depression 460. The abrupt decrease provided by depression 460 will induce the formation of a melt pool juxtaposed with the leading face 454 by virtue of the void produced as the depression 460 sweeps along its path of travel during rotation of screw conveyor 418 in the direction of arrow 429.

Figure 8:
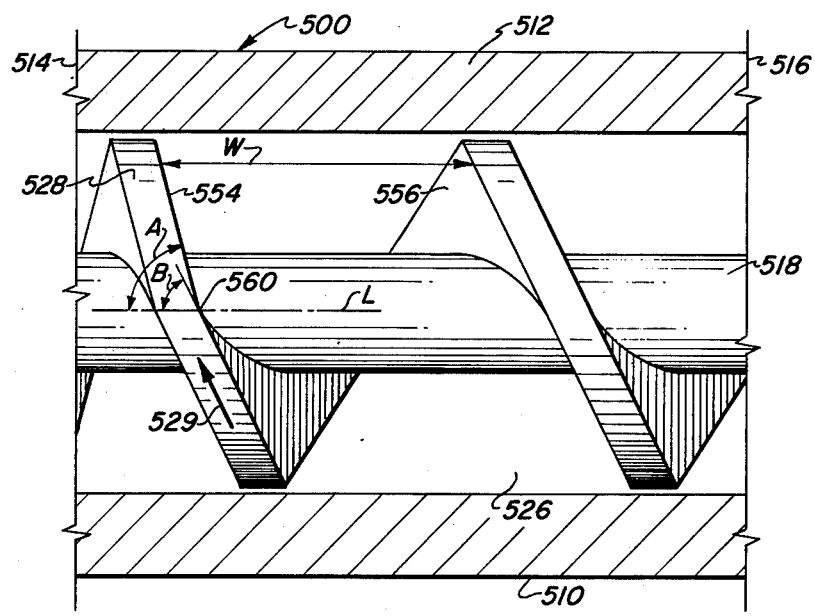
FIG. 8 is an enlarged segment of a still further plasticating extruder constructed in accordance with the invention.

Turning now to FIG. 8, still another embodiment of the invention is shown in the form of extruder 500, a segment of which is illustrated at 510. Segment 510 corresponds to portion 111 of extruder 10 and segments 110, 210, 310 and 410 of extruders 100, 200, 300 and 400, respectively.

Extruder 500 includes a barrel 512 extending axially between upstream portion 514 and downstream portion 516, and a screw conveyor 518 in the barrel. A channel 526 is defined by flight 528 and has a prescribed width W between confronting leading and trailing faces 554 and 556, respectively.

Flight 528 has a given helix angle in the solids conveying zone where the material in the channel 526 is compacted. The means providing the abrupt change in the width W is in the form of an abrupt decrease in the helix angle of the leading face 554 of flight 528 from angle A to angle B. The helix angle is the angle between the leading face 554 and a line parallel to the longitudinal axis L of the screw conveyor 518. The abrupt change from angle A to angle B at 560 will induce the formation of a melt pool adjacent the leading face 554 by virtue of the abrupt increase in width W as a result of the abrupt change from angle A to angle B during rotation of screw conveyor 518 in the direction of arrow 529.

Figure 9:
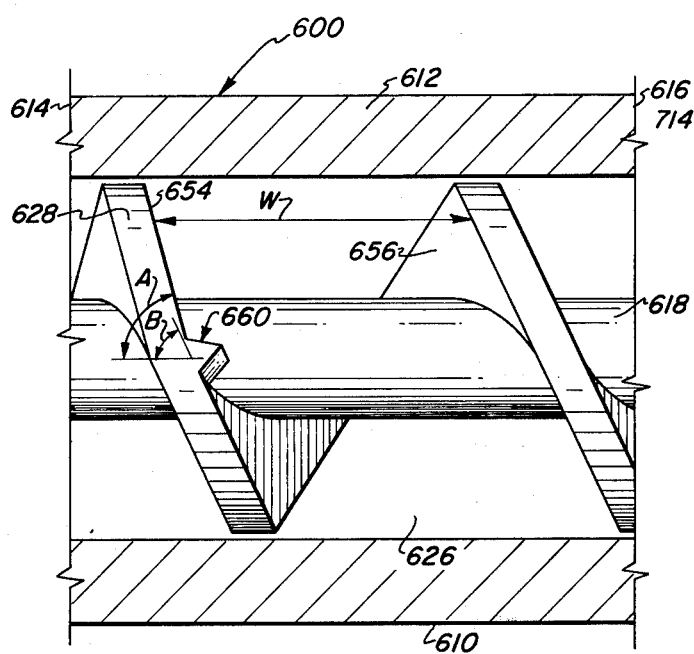
FIG. 9 is an enlarged segment of yet another plasticating extruder constructed in accordance with the invention.

In the embodiment of FIG. 9, the invention is shown in the form of extruder 600, a segment of which is illustrated at 610. Segment 610 corresponds to portion 111 of extruder 10 and segments 110, 210, 310, 410 and 510 of extruders 100, 200, 300, 400 and 500, respectively.

Extruder 600 includes a barrel 612 extending axially between upstream portion 614 and downstream portion 616, and a screw conveyor 618 in the barrel. A channel 626 is defined by flight 628 and has prescribed width W between confronting leading and trailing faces 654 and 656, respectively.

Flight 628 has a given helix angle in the solids conveying zone where the material in the channel 626 is compacted. The means providing the abrupt change in the width W is in the form of an abrupt decrease in the helix angle of the leading face 654 of flight 628 from angle A to angle B and a protuberance in the form of rib 660 at the location of the change from angle A to angle B. The combined effect of the change in helix angle and the presence of rib 660 will induce the formation of a melt pool adjacent the leading face 654 immediately behind rib 660.

Figure 10:
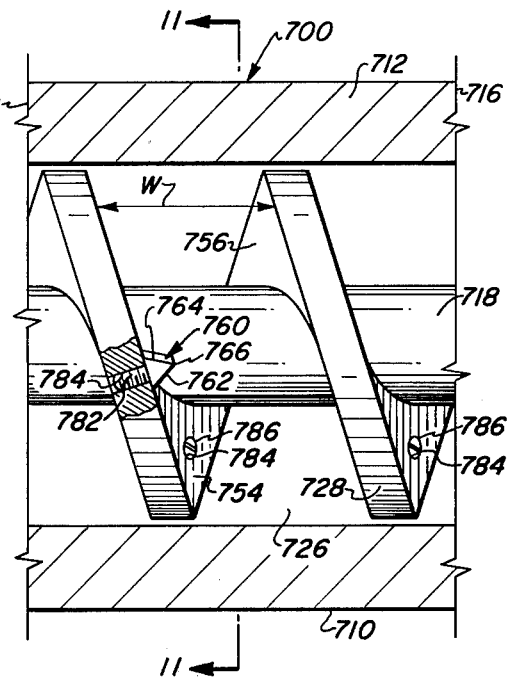
FIG. 10 is an enlarged segment of another plasticating extruder constructed in accordance with the invention.
Figure 11:
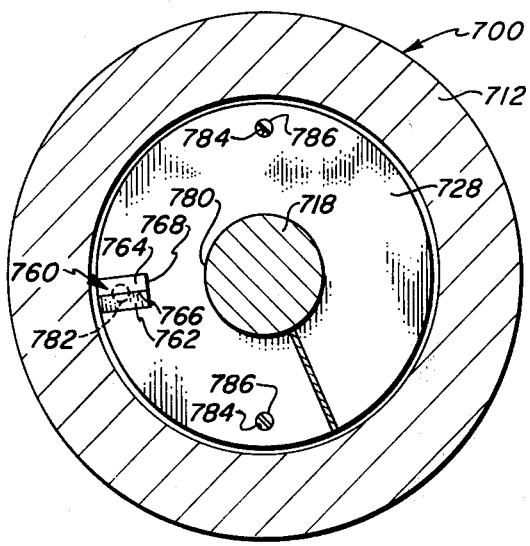
FIG. 11 is a cross-sectional view taken along line 11—11 of FIG. 10.

In the embodiment of FIGS. 10 and 11, the invention is shown in the form of extruder 700, a segment of which is illustrated at 710. Segment 710 corresponds to portion 111 of extruder 10 and segments 110, 210, 310, 410, 510 and 610 of extruders 100, 200, 300, 400, 500 and 600, respectively.

Extruder 700 includes a barrel 712 extending axially between upstream portion 714 and downstream portion 716, and a screw conveyor 718 in the barrel. A channel 726 is defined by flight 728 and has a prescribed width W between confronting leading and trailing faces 754 and 756, respectively.

The means providing the abrupt change in the width W is a protuberance in the form of a rib 760 having a cross-sectional configuration which includes generally straight sides 762 and 764 intersecting at a point at the downstream edge 766 of the rib. Rib 760 extends radially along the leading face 754 for only a portion of the radius of the flight. Thus, as seen in FIG. 11, rib 760 terminates at inner end 768 which is spaced radially from the root 780 of flight 728.

While in the previously described embodiments the various illustrated means providing the abrupt change in the width W were shown unitary with the screw conveyor, rib 760 is releasably attached to flight 728 by means of a threaded stud 782 which is integral with rib 760 and is received within a complementary threaded aperture 784 in the leading face 754 of the flight. The flight 728 is provided with a plurality of such threaded apertures 784 at various locations along the length of the screw conveyor 718. The rib 760 thus is selectively located at any one of a plurality of locations along the length of the screw conveyor by threaded stud 782 into any chosen aperture 784. In this manner, the screw conveyor can be adapted to any one of a variety of operating conditions, depending upon the particular material being extruded, the operating temperatures and other parameters affecting the optimum location of the transition from the solids conveying zone to the melting zone. Hence, screw conveyor 718 can be "tuned" for optimum performance under a variety of operating conditions. When the rib 760 is located in an appropriate aperture 784 the unused apertures 784 are closed with threaded plugs 786.

Figure 12:
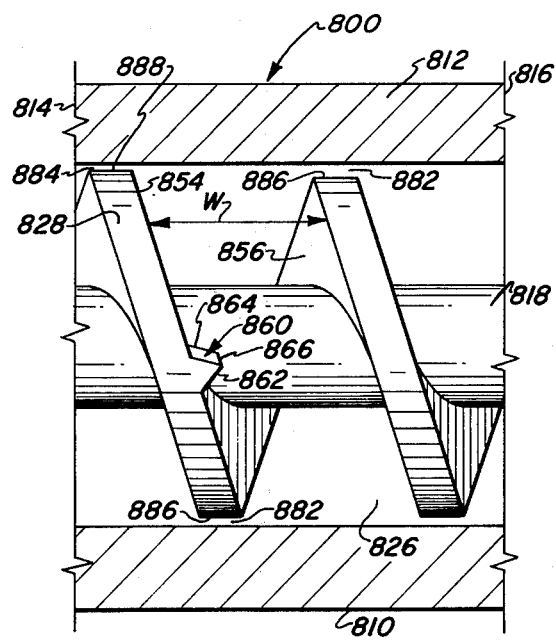
FIG. 12 is an enlarged segment of still another plasticating extruder constructed in accordance with the invention.

Turning now to FIG. 12, another embodiment of the invention is shown in the form of extruder 800, a segment of which is illustrated at 810. Segment 810 corresponds to portion 111 of extruder 10 and segments 110, 210, 310, 410, 510, 610 and 710 of extruders 100, 2000, 300, 400, 500, 600 and 700, respectively.

Extruder 800 includes a barrel 812 extending axially between upstream portion 814 and downstream portion 816, and a screw conveyor 818 in the barrel. A channel 826 is defined by flight 828 and has a prescribed width W between confronting leading and trailing faces 854 and 856, respectively.

The means providing the abrupt change in the width W is a protuberance in the form of a rib 860 having a cross-sectional configuration which includes generally straight sides 862 and 864 intersecting at a point at the downstream edge 866 of the rib. Thus, a melt pool will be induced behind the rib 860, adjacent side 862, as the screw conveyor 818 rotates in the direction of arrow 829.

As explained hereinabove, melt first appears in the form of a continuous melt film between the solid bed and the inner surface of the barrel. When the melt pool forms, the melt in the pool is supplied from the melt film, as illustrated in FIG. 2. It has been found that where a melt pool is induced in accordance with the teachings of the present invention, there is a tendency for the melt film to become exhausted immediately downstream of the location where the melt pool is induced, with a concomitant increase in the shear forces in the solid bed where the melt film tends to become exhausted. In order to preclude any excessive shear forces, it is advantageous to maintain the presence of a melt film immediately downstream of that location. Thus, in extruder 800, the clearance between the flight 828 of the screw conveyor 818 and the internal surface of the barrel 812 is increased at 882 over the clearance at 864, by decreasing the outer diameter of the flight at 886 to a diameter less than the outer diameter at 888. In this manner, the melt film in the vicinity of the flight of decreased diameter, just downstream of the melt pool inducing rib 860, is made thicker and of greater volume so that the melt in the film does not become exhausted as a result of the sudden formation of a melt pool. While the expedient of increasing the clearance between the flight and the barrel just downstream of the melt pool inducing means is illustrated in connection with an embodiment employing rib 860 as the means for inducing the formation of a melt pool, it is to be understood that the expedient is equally applicable to any of the described embodiments utilizing the various described melt pool inducing means.

It will be apparent that in each of the above described embodiments, the method of the invention is carried out by changes in the configuration of the screw conveyor which do not require a radical change in the overall arrangement of a conventional extruder. Thus, the apparatus and method of the invention provide practical means by which the effectiveness of conventional extruders can be increased so that they may operate at higher melting capacity, at higher levels of production and produce better quality extrudate.

It is to be understood that the above detailed description of embodiments of the invention is provided by way of example only. Various details of design and construction may be modified without departing from the true spirit and scope of the invention as set forth in the appended claims.

The embodiments of the invention in which an exclusive property or privilege is claimed are defined as follows:

1. Apparatus for preparing a plasticated material from solids of a given material introduced into the apparatus, said apparatus comprising:
   a barrel having an inner surface;
   supply means for introducing said solids of a given material into the barrel;
   a screw conveyor in the barrel, said screw conveyor including a flight which, together with the inner surface of the barrel, defines a channel for conveying the given material from the supply means in a downstream direction as the material is melted within the channel, said flight having a leading face facing downstream and a trailing face facing upstream, said channel having a predetermined width between confronting leading and trailing faces;
   the channel including a solids conveying zone having a length extending between the supply means and a point where the temperature of the inner surface of the barrel is at the melting point of the given material, and a melting zone located downstream from the solids conveying zone; and
   means on the screw conveyor, at the leading face of the flight, in the vicinity of said point where the temperature of the inner surface of the barrel is at the melting point of the given material for inducing the formation of a melt pool in the channel at a location downstream from the supply means a distance approximately equal to the length of the solids conveying zone, said melt pool inducing means having a configuration which effects a change in the width of the channel in at least that portion of the channel located in the vicinity of said point, said change in width being accompanied by so abrupt an increase in width at that portion as to form a void between the solids and the leading face of the flight to accommodate the melt pool at said location.

2. The invention of claim 1 wherein the clearance between the flight of the screw conveyor and the inner surface of the barrel is increased immediately downstream of said location.

3. The invention of claim 2 wherein the increase in clearance is provided by a decrease in the outer diameter of the flight immediately downstream of said location.

4. The invention of claim 1 wherein said configuration of said means for inducing the formation of a melt pool comprises a protuberance on the leading face of the flight, at said location, the protuberance projecting from said leading face in a downstream direction toward the confronting trailing face.

5. The invention of claim 4 including means for releasably attaching the protuberance to the flight at any one of a plurality of locations along the screw conveyor.

6. The invention of claim 4 wherein the protuberance is a radially extending rib.

7. The invention of claim 6 wherein the rib has a cross-sectional configuration including generally straight sides intersecting at a point at the downstream end of the protuberance.

8. The invention of claim 6 wherein the rib has a cross-sectional configuration including generally concave sides intersecting at a point at the downstream end of the protuberance.

9. The invention of claim 6 wherein the rib has a cross-sectional configuration including generally concave sides intersecting a convex curve along the downstream end of the protuberance.

10. The invention of claim 1 wherein the flight has a given thickness in the solids conveying zone and the configuration of the means for inducing the formation of a melt pool comprises a depression in the contour of the leading face of the flight at said location.

11. The invention of claim 10 wherein the depression is established by an abrupt decrease in the thickness of the flight at said location.

12. The invention of claim 1 wherein the flight is helical and has a given helix angle in the solids conveying zone and the configuration of the means for inducing the formation of a melt pool comprises an abrupt decrease in the helix angle of the leading face of the helical flight.

13. The invention of claim 12 wherein the configuration of the means for inducing the formation of a melt pool further includes a protuberance on the leading face of the flight, at said location, the protuberance projecting from the leading face in a downstream direction toward the confronting trailing face.

14. Method for preparing a plasticated material from solids of a given material introduced into plasticating apparatus having a barrel including an inner surface, supply means for introducing said solids of a given material into the barrel, and a screw conveyor in the barrel, the screw conveyor including a flight which, together with the inner surface of the barrel, defines a channel for conveying the given material from the supply means in a downstream direction as the material is melted within the channel, the flight having a leading face facing downstream and a trailing face facing upstream, the channel having a predetermined width between opposite leading and trailing faces, said channel including a solids conveying zone having a length extending between the supply means and a point where the temperature of the inner surface of the barrel is at the melting point of the given material, and a melting zone located downstream from the solids conveying zone, said method comprising the step of inducing the formation of a melt pool in the channel, at the leading face of the flight, at a location downstream from the supply means a distance approximately equal to the length of the solids conveying zone by effecting a change in the width of the channel in at least that portion of the channel located in the vicinity of the point where the temperature of the inner surface of the barrel is at the melting point of the given material, said change being accompanied by so abrupt an increase in width at that portion as to form a void between the solids and the leading face of the flight to accommodate the melt pool at said location.

15. The invention of claim 14 wherein the change in the width of the channel is accompanied by the step of increasing the clearance between the flight of the screw conveyor and the inner surface of the barrel immediately downstream of said location.

* * * * *